United States Patent
Murao et al.

(10) Patent No.: US 6,653,001 B2
(45) Date of Patent: Nov. 25, 2003

(54) MAGNETIC TAPE HAVING SPECIFIC MEANDERING FEATURES

(75) Inventors: Naoto Murao, Kanagawa (JP); Mikio Ohno, Kanagawa (JP); Nobuyoshi Asada, Kanagawa (JP); Youichi Hayata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 119 days.

(21) Appl. No.: 10/016,618

(22) Filed: Oct. 26, 2001

(65) Prior Publication Data

US 2002/0155324 A1 Oct. 24, 2002

(30) Foreign Application Priority Data

Oct. 26, 2000 (JP) ........................................ 2000-326517

(51) Int. Cl.7 .............................. B32B 5/16; G11B 5/73
(52) U.S. Cl. ............................... 428/694 BB; 428/329; 428/336; 428/694 BH; 428/543; 428/900
(58) Field of Search ................... 428/694 BB, 543, 428/900, 694 BH, 329, 336

(56) References Cited

U.S. PATENT DOCUMENTS

| | | | | |
|---|---|---|---|---|
| 4,885,964 A | * | 12/1989 | Nielsen et al. | |
| 5,432,648 A | * | 7/1995 | Watanabe et al. | |
| 6,092,452 A | * | 7/2000 | Adami | |
| 6,228,461 B1 | * | 5/2001 | Sueki et al. | |
| 6,429,411 B1 | * | 8/2002 | Iwasaki et al. | |

* cited by examiner

*Primary Examiner*—H. Thi Le
(74) *Attorney, Agent, or Firm*—Stroock & Stroock & Lavan LLP

(57) ABSTRACT

Provided is a thin magnetic tape with good tracking and very little output variation in VTRs. The magnetic tape comprises a flexible support, a magnetic layer provided on one side of said flexible support and a backcoat layer provided on the reverse side of said flexible support. The magnetic tape has a stiffness equal to or less than 70 mg·mm$^2$ in the width direction, an average meandering amount of a tape edge trajectory traced by each of both end in the width direction of said tape observed from the direction perpendicular to said magnetic layer surface is equal to or less than 15 μm in every end, and an intensity of a meandering component having a cycle of 20 to 200 mm is equal to or less than 30 percent of the intensity of a meandering component having a cycle of 20 to 10,000 mm.

18 Claims, 3 Drawing Sheets

MAGNETIC TAPE HAVING SPECIFIC MEANDERING FEATURES

FIELD OF THE INVENTION

The present invention relates to a thin magnetic tape with good tracking and very little output variation in VTRs. More particularly, the present invention relates to a magnetic tape in which there is little meandering of the tape edge trajectory and the ratio of the intensity of short cycle meandering components is low.

BACKGROUND OF THE INVENTION

Generally, magnetic tapes with prescribed width are manufactured by first forming a magnetic layer on a wide flexible support, forming a backcoat layer on the reverse side thereof, and then using a slitter to slit to prescribed width. That is, first, a ferromagnetic powder is mixed with and dispersed in binder, additives, an organic solvent, and the like to prepare a coating material for forming magnetic layers. This coating material is then applied on one surface of a wide flexible support, magnetically oriented, and dried to form a magnetic layer. A coating material for forming backcoat layers is prepared by admixing and dispersing abrasives, binder, additives, an organic solvent, and the like, and this coating material is applied to the reverse side of the flexible support and dried to form a backcoat layer. The wide magnetic tape blank that has been thus manufactured is processed by calendering or the like and slitted to desired width, such as 8 mm, ½ inch, or one inch, are formed therefrom with a slitter to manufacture magnetic tape.

The usual system is one in which the magnetic tape blank is placed on a slitter configured of multiple opposed upper blade and lower blade and slit to desired width, and each of the magnetic tapes with prescribed width that is obtained is passed over guide rollers and wound onto a hub. In the slitted magnetic tape, the tape edge trajectory traced by each of the two edges in the width direction of the magnetic tape (referred to hereinafter as "tape edge trajectory") is desirably linear when observed in a direction perpendicular to the magnetic layer surface. However, since there is eccentricity and vibration in the rollers and slitting blades from which the slitter is composed, variation in tension and eccentricity in the winding shafts, and transverse shifting of the magnetic tape blank, there is meandering of the tape edge trajectory of the magnetic tape that is actually manufactured.

In recent years, digitization of data has led to a massive increase in the amount of information that is recorded. As a result, magnetic tapes and VTRs have been improved in various ways. In magnetic tapes, microgranular magnetic powder of short major axis length has been employed and the thickness of the magnetic tape itself has been reduced to increase the recording capacity per unit volume. In VTRs, the wavelength has been shortened and the track narrowed to increase the recording capacity per unit volume. Combining these magnetic tapes and VTRs permits a substantial increase in volume recording density.

In such thin tapes for high density recording, the above-described slitting method is employed to slit in the manufacturing of tapes having meandering tape edge trajectories similar to those of conventional thick tapes. However, the thin tapes differ from conventional thick tapes in that stiffness, particularly in the width direction, is low and tape strength is low. Thus, there is a problem in that when position regulation by the upper and lower flanges of the guide rollers in the VTR is performed poorly when running a thin tape through a VTR, leading to tracking failure, variation in output increases. This problem is particularly marked in thin tapes with a width direction stiffness equal to or less than 70 mg.mm$^2$.

One method of solving this problem is to improve position regulation by the guide rollers and thus improve tracking. However, when position regulation is improved, since the strength of the magnetic tape in the width direction is low as set forth above, the edges thereof buckle and crease, which ends up causing "edge creases" resulting in dropout.

SUMMARY OF THE INVENTION

Accordingly, an object of the present invention is to provide a thin magnetic tape for high-density recording affording good tracking and extremely low output variation. That is, an object of the present invention is to provide a thin magnetic tape in which meandering of the tape edge trajectories is controlled to permit linear running in a VTR.

DETAILED EXPLANATION OF THE INVENTION

Figure 1:
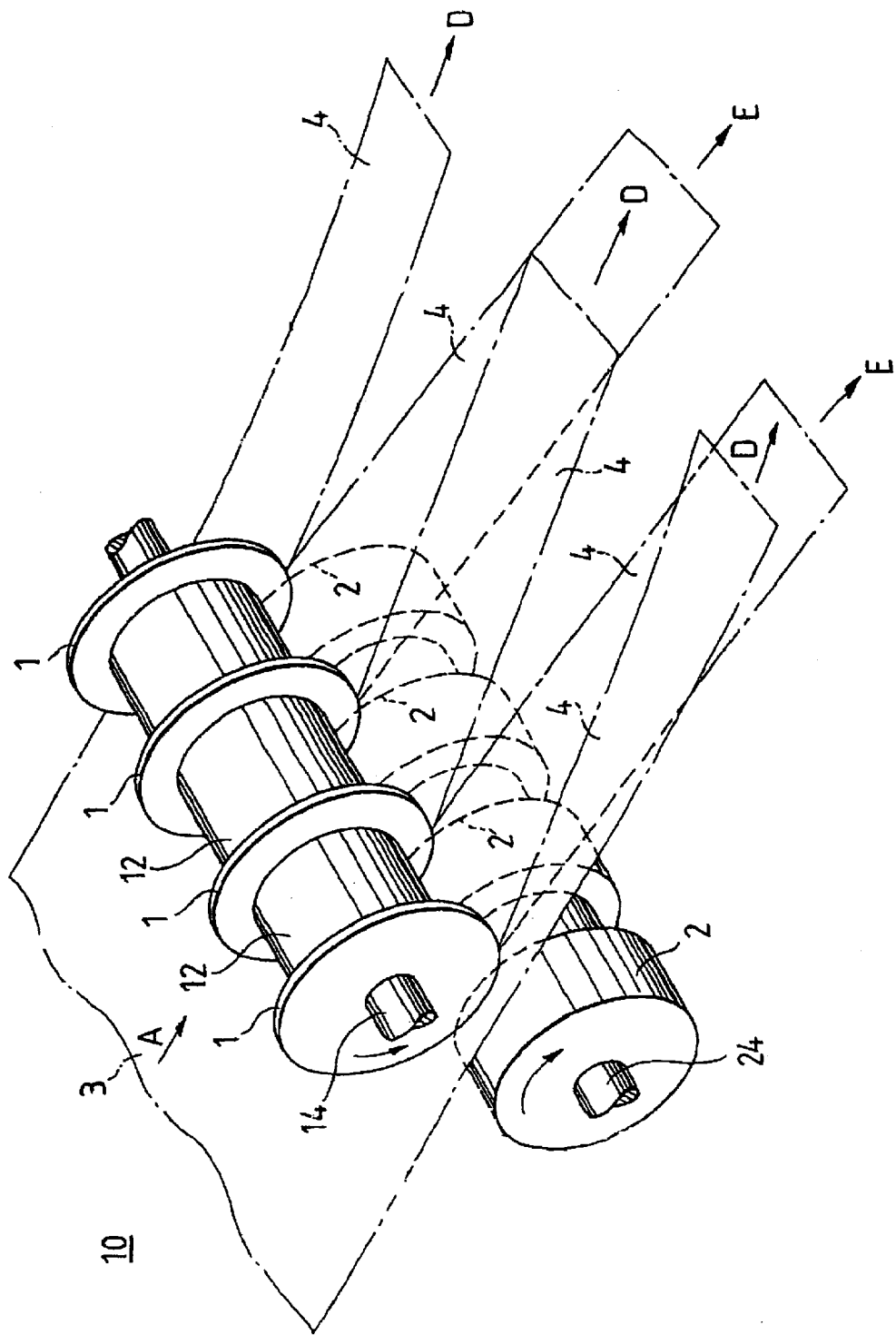
FIG. 1 is a perspective view of the structure of the main components of a slitter.

As a result of extensive research conducted to solve the above-stated problems, the present inventors discovered that when the average amount of meandering of the tape edge trajectory in a thin magnetic tape and the intensity ratio of short cycle meandering components were controlled, tracking failure could be avoided, output variation could be extremely low, and edge creasing was prevented. The present invention was devised on this basis.

That is, the present invention provides a magnetic tape comprising a flexible support, a magnetic layer provided on one side of said flexible support and a backcoat layer provided on the reverse side of said flexible support, wherein said magnetic tape has a stiffness equal to or less than 70 mg.mm$^2$ in the width direction, an average meandering amount of a tape edge trajectory traced by each of both end in the width direction of said tape observed from the direction perpendicular to said magnetic layer surface is equal to or less than 15 µm in every end, and an intensity of a meandering component having a cycle of 20 to 200 mm is equal to or less than 30 percent of the intensity of a meandering component having a cycle of 20 to 10,000 mm.

As a result of a detailed investigation of the causes of tracking failure, the present inventors discovered that when there is meandering of a cycle equal to or less than 200 mm of the tape edge trajectories of a magnetic tape, head contact and linear running properties decrease markedly. 200 mm is approximately equivalent to the tape path length from the position regulating guide roller on the entry side relative to the rotating head in a VTR to the position regulating guide roller on the exit side. When the meandering cycle of the tape edge trajectory is equal to or less than 200 mm, regulation of vertical movement of the magnetic tape by the guide rollers in front of and behind the cylinder ceases from working and the magnetic tape runs while being moved vertically along with meandering of the tape edge trajectories. By contrast, when the meandering cycle of the tape edge trajectories is equal to or higher than 200 mm, the magnetic tape runs linearly irrespective of meandering of the tape edge trajectories.

Meandering of the tape edge trajectories consists of the overlapping of various meandering components of various cycle lengths. That is, the base line of the short cycle meandering curve generally traces the long cycle meandering curve. Based on the results of the above-described investigation by the present inventors, the effect of meandering components having a comparatively short cycle equal to or less than 200 mm must be reduced as much as possible. Accordingly, the present inventors conducted further investigation, resulting in the discovery that when the intensity of meandering components having a cycle of 20 to 200 mm was equal to or less than 30 percent of the intensity of meandering components having a cycle of 20 to 10,000 mm, tracking failure was avoided. The intensity of meandering components having a cycle of 20 to 200 mm is preferably equal to or less than 20 percent, and still more preferably equal to or less than 10 percent. The intensity ratio of meandering components is measured by the method described in the embodiments.

Suppressing the intensity of meandering components having comparatively short cycles of 20 to 200 mm as mentioned above prevents vertical movement during magnetic tape running in a VTR. However, simply suppressing the intensity of short cycle meandering components does not necessarily suppress output variation. When meandering due to meandering components of the comparatively long cycles of 200 to 10,000 mm becomes excessive, output variation results from the output change according to those cycles. As a result of an investigation into the level of meandering required to adequately suppress such output variation, the present inventors discovered that an average meandering quantity equal to or less than 15 $\mu$m, preferably equal to or less than 10 $\mu$m, suffices. The average amount of meandering is measured by the method described in the embodiment.

Thus, the facts that tracking failure can be avoided and output variation can be reduced by conducting regulation of both the intensity of meandering components having cycles of 20 to 200 mm and the average amount of meandering were first discovered by the present inventors. When employing the magnetic tape of the present invention, it is not necessary to strictly regulate vertical movement of the tape with guide rollers for ensuring running linearity. Thus, the magnetic tape of the present invention can be employed to avoid tracking failure and suppress output variation in conventional VTRs without any adjustment thereto.

To achieve conditions of meandering of the tape edge trajectories of magnetic tapes falling within the range of the present invention, it suffices to suitably adjust the slitter settings. A common slitter is described below.

Figure 2:
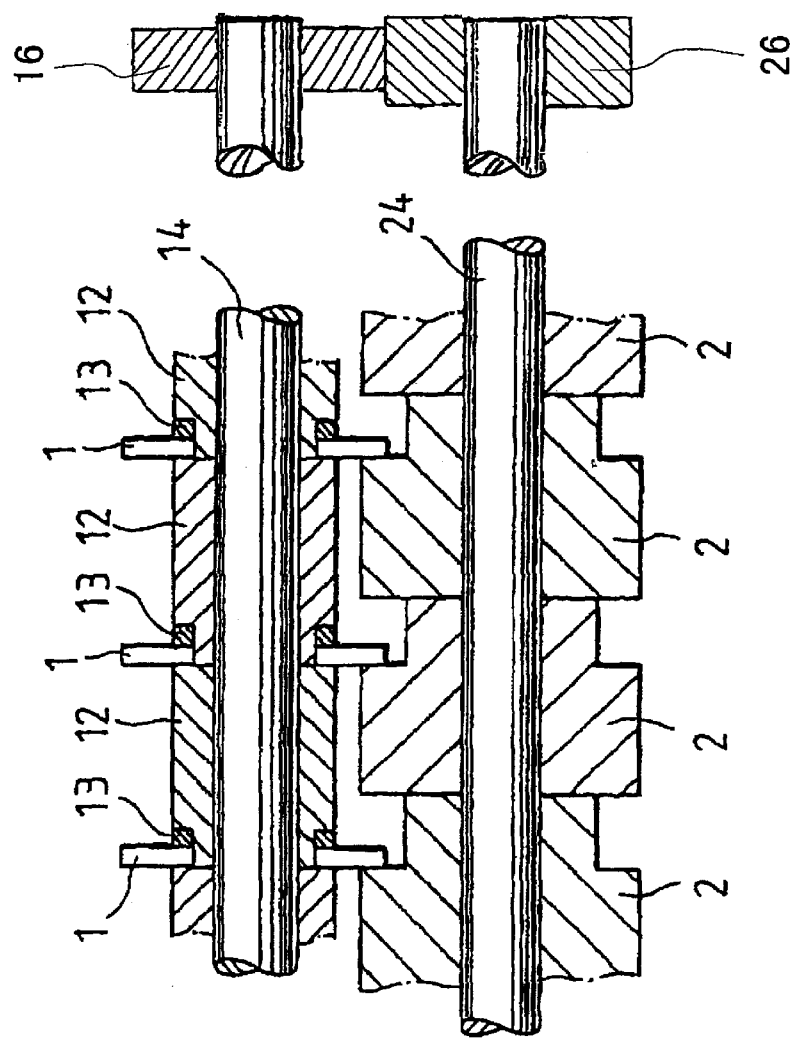
FIG. 2 is a schematic cross-sectional view of the portion along the rotation axis of the upper and lower round blades shown in FIG. 1.
Figure 2:
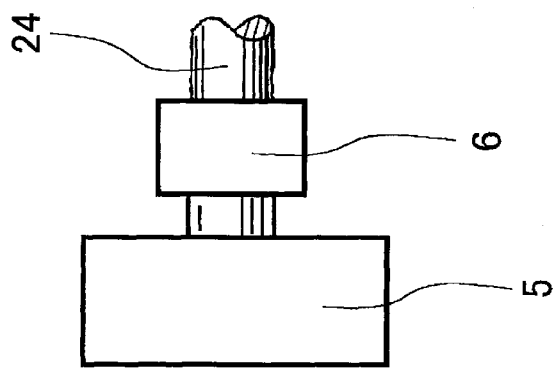

FIG. 1 is a perspective view of the main components of a slitter. FIG. 2 is a schematic cross-sectional view of the portion along the rotation axis of the upper and lower round blades showed in FIG. 1. As shown in FIGS. 1 and 2, multiple lower round blades 2 are coaxially supported and secured to lower shaft 24 supported in a freely rotating manner by a pair of bearings (not illustrated in the figures) with a prescribed spacing. Multiple upper blades 1 respectively interlocking to these lower blades are supported and secured to upper shaft 14 in a freely rotating manner by a pair of bearings (not illustrated in the figures) through fastening ring 12 and elastic member 13. The mechanism transmitting rotational drive force to upper shaft 14 and lower shaft 24 of the slitter transmits a rotational drive force by means of a motor 5 or the like to one end of lower shaft 24 through a mechanical coupling mechanism 6 to drive rotation of the lower shaft. The lower shaft rotational drive force is transmitted to upper shaft 14 through a pair of gears 26 and 16 secured on the other end of the lower shaft and the corresponding end of the upper shaft, respectively. In this manner, the upper round blade and the lower round blade are rotated in opposite directions (in FIG. 1, the lower round blade move in a clockwise direction and the upper round blade in a counterclockwise direction), while passing magnetic tape blank 3 between them in a direction conforming to the direction of rotation of the round blade (indicated by arrow A in FIG. 1) and pressure cutting it by means of the upper and lower round blades to obtain a magnetic tape 4 of prescribed width. Each of slitted magnetic tapes 4 is wound on the hub of a winding device, not shown.

Such a drive system employing a mechanism transmitting the rotational drive force of lower shaft 24 through a pair of gears 26 and 16 to upper shaft 14 will be referred to as a "conventional slitting system." However, in such a system, vibration of comparatively short cycle is produced in the gear drive portion, and when the slitting speed is increased, this increased vibration becomes a substantial drawback. To establish meandering conditions within the range of the present invention, vibration entering the drive system of slitting blade is desirably reduced to the extent possible. For example, design changes can be implemented, such as changing the portion driven by gears to a belt drive and changing the drive joint portions to a low-vibration structure, to reduce vibration. The improved drive system in which the mechanism of transmitting rotational drive force from lower shaft 24 to upper shaft 14 is changed to a belt drive employing a belt and mechanical coupling mechanism 6 is changed to a low-vibration structure will be referred to as the "new slitting system." This system permits reduction in the amount of meandering of the magnetic tape as well as reduction in the meandering of short cycle components.

The slitter of FIG. 1 is an example where such changes have been made. In this slitter, driving of the upper blade rotating shaft and the lower blade rotating shaft employs a belt, and coupling of the lower blade to the rotating shaft of the drive motor (when a reducing gear is present, the drive shaft on the reduction side) is also implemented with low-vibration structures.

The slitting speed during cutting of magnetic tape is desirably high. The slitting speed normally ranges from 200 to 600 m/min, preferably from 400 to 600 m/min. The perimeter velocity ratio of the lower blade and upper blade is normally set to 1.00 to 1.10, preferably 1.05 to 1.10. Further, the maximum interlocking depth of the upper blade and the lower blade is preferably substantial, normally being set to 0.25 to 0.90 mm and preferably 0.50 to 0.90 mm. Further, the ratio of the magnetic tape conveyance velocity to the perimeter velocity of the lower blade ranges from 1.0 to 1.1, preferably from 1.02 to 1.08. The amount of eccentricity of the lower blade rubber nip roller stabilizing conveyance of the tape directly prior to slitting is desirably held to equal to or less than 30 $\mu$m.

In the magnetic tape of the present invention, so long as a magnetic layer is provided on one side of a flexible support and a backcoat layer is provided on the reverse side thereof, there are no particular limitations on the layer configuration. For example, a nonmagnetic layer or a second magnetic layer may be provided between the magnetic layer and the flexible support, and an undercoating layer may be provided between the magnetic layer or the nonmagnetic layer and the flexible support, as well as between the backcoat layer and the flexible support. Still further, the magnetic layer and backcoat layer may be multilayered in structure.

The thickness of the magnetic tape of the present invention is not specifically limited. However, it usually ranges from 4 to 14 µm, preferably from 8 to 11 µm. The thickness of the magnetic layer in the magnetic tape of the present invention is not specifically limited. However, the selection of a thickness of 0.05 to 5.0 µm is normal, and 0.1 to 3.5 µm is preferred. Nor is the thickness of the backcoat layer specifically limited. However, the selection of a thickness of 0.3 to 1.0 µm is normal, and 0.4 to 0.7 µm is preferred.

The magnetic layer of the magnetic tape of the present invention normally comprises ferromagnetic powder, a binder for dispersing the powder, and various additives as needed. Examples of additives are carbon black, abrasives, dispersants, dispersion adjuvants, lubricants, antimildew agents, antistatic agents, and antioxidants. An essentially identical composition may be employed in the backcoat layer and magnetic layer as regards binders and additives. However, it is important that the type and quantity of components in the magnetic layer and backcoat layer are appropriately selected. Further, when various nonmagnetic powders such as carbon black and alumina are employed in the magnetic layer and backcoat layer, it is desirable to suitably selected the particle size, shape, and the like thereof.

The flexible support employed in the magnetic tape of the present invention will be described first. The support employed in the present invention is a nonmagnetic flexible support that is not specifically limited. The thickness thereof generally ranges from about 3 to 10 µm, with a thickness of about 6 to 9 µm being desirable. Further, Young's modulus in the longitudinal direction ranges from 3.92 to 11.76 GPa (400 to 1,200 kg/mm$^2$), with 4.41 to 9.80 GPa (450 to 1,000 kg/mm$^2$) being desirable. Examples of materials suitable for use as the flexible support include polyesters such as polyethylene terephthalate and polyethylene naphthalate; polyolefins such as polypropylene; cellulose derivatives such as cellulose triacetate and cellulose diacetate; vinyl resins such as polyvinyl chloride; polycarbonate, polyimide, polyamide, polysulfone and the like. Among them, polyethylene terephthalate, polyethylene naphthalate, polyamide and polyimide are preferably used. Polyethylene naphthalate (PEN) is employed with particular preference. Prior to coating, these flexible supports may be subjected to corona discharge treatment, plasma processing, undercoating, heat treatment, dust removal treatment, metal vapor deposition, alkali treatment, and the like. These flexible supports are described in, for example: West German Patent Publication No. 3,338,854; Japanese Unexamined Patent Publication (KOKAI) Showa No. 59-116926; U.S. Pat. No. 4,388,368; and Sachio Mitsuishi, "Fibers and Industry", Vol. 31, pp. 50 to 55 (1975). The center line average surface roughness of these flexible supports preferably ranges from 0.001 to 0.5 µm (cutoff value 0.25 mm).

The above-described polyethylene naphthalate that can be employed in the present invention may also comprise a polyester composition that does not cause the polyethylene naphthalate to lose its fundamental properties, such as ethylene-2,6-naphthalene naphthalene dicarboxylate homopolymer, a copolymer comprising 70 weight percent of repeating units in the form of ethylene-2,6-naphthalene dicarboxylate, and a mixture of this and another polymer (where the amount of the polyethylene naphthalate is 70 weight percent or more). These polyethylene naphthalates are polymers having film-forming capabilities.

The polyethylene naphthalate film suitable for use in the present invention can be manufactured by biaxial orientation of nonoriented film. For example, when employing sequential biaxial orientation, the first stage of drawing is conducted at an elevated temperature exceeding the glass transition temperature of polyethylene naphthalate, preferably by 3 to 10° C., and the second stage of drawing is conducted at a temperature identical to, or exceeding by up to 10° C., the first stage orientation temperature. The drawing factor is at least 2 in one axial direction, preferably equal to or higher than 2.5, and the surface area factor is equal to or higher than sixfold, preferably equal to or higher than eightfold. Heat treatment (heat setting) is desirably conducted at 170° C. or greater, preferably 190° C. or greater, under tension. The upper limit of the heat treatment temperature also depends on the treatment period, but must be a temperature at which a film will form in a stable shape. The heat treatment period may be from several seconds to several tens of seconds, with 3 to 30 seconds preferred. Subsequently, sequential drawing is preferably conducted to 1.05 to 2.5 fold in the longitudinal direction and 1.05 to 2.5 fold in the transverse direction at a temperature ranging from 10° C. below the glass transition point to 40° C. below the melting point, with another heat treatment being desirably conducted at a temperature ranging from 50° C. below the glass transition point to 10° C. below the melting point.

The ferromagnetic powder employed in the magnetic layer is not specifically limited, but a ferromagnetic metal powder comprising Fe, Co, or Ni is preferably employed. Among these, the use of a ferromagnetic metal micropowder such as α—Fe, Co, Ni, Fe—Co alloy, Fe—Co—Ni alloy, Fe—Co—Ni—P alloy, Fe—Co—Ni—B alloy, Fe—Ni—Zn alloy, Ni—Co alloy, Co—Ni—Fe alloy, or Fe—Al alloy is preferred.

The shape of these ferromagnetic metal powders is not specifically limited, but an acicular, granular, cubic, rice-particle shaped, or plate-shaped powder may normally be employed.

The particle size is, for acicular particles, a major axis length of 0.05 to 0.5 µm, preferably 0.05 to 0.3 µm, and more preferably 0.10 to 0.25 µm. The ratio of the major axis length/minor axis length ranges from 2/1 to 25/1, preferably from 3/1 to 15/1, and still more preferably from 4/1 to 12/1. For plate-shaped particles, the plate diameter ranges from 0.02 to 0.20 µm, preferably from 0.03 to 0.10 µm, still more preferably from 0.04 to 0.07 µm, and the plate diameter/plate thickness ratio ranges from 1/1 to 30/1, preferably from 2/1 to 10/1, and still more preferably from 2.5 to 7/1.

The specific surface area ($S_{BET}$) of these ferromagnetic metal powders ranges from 47 to 80 m$^2$/g, more preferably from 53 to 70 m$^2$/g. The coercivity (Hc) ranges from 99.5 to 199 kA/m. The saturation magnetization (σS) ranges from 100 to 180 Am$^2$/kg, preferably from 110 to 150 Am$^2$/kg. The moisture content desirably ranges from 0.1 to 2.0 weight percent, and the pH desirably ranges from 3 to 11 (5 g of ferromagnetic powder/100 g of water). The surface of the ferromagnetic metal powder may, based on the respective objective, have a rust-preventing agent, surface treatment agents, dispersant, lubricant, or antistatic agent described further below that is adsorbed by immersion in solvent prior to dispersion.

The metal component of the ferromagnetic metal powder comprises 60 weight percent or more, with 70 weight percent or more of the metal component being comprised of at least one ferromagnetic metal powder or alloy (such as Fe, Fe—Co, Fe—Co—Ni, Co, Ni, Fe—Ni, Co—Ni, Co—Ni—Fe, and Fe—Al). Iron carbide, iron nitride, or another alloy which may comprise some other component (such as Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La Ce, Pr, Nd, B, and P) may be employed in a range equal to or less than 40 weight percent, preferably equal to or less than 20 weight percent, of the metal component. To supplement the strength of the metallic iron, the addition of Al, Si, and Cr, either singly or in combination, to the outer layer is desirable. The above-described ferromagnetic metal powder may also comprise a small quantity of hydroxides, oxides, alkali metal elements (Na, K, and the like), and alkaline earth metal elements (Mg, Ca, Sr). Methods of manufacturing these ferromagnetic metal powders are already known and may be employed to manufacture the ferromagnetic metal powders employed in the present invention.

The following are specific examples of methods of manufacturing ferromagnetic metal powders suitable for use in the present invention.

(a) Reduction of a complex organic acid salt (chiefly oxalates) with a reducing gas such as hydrogen.

(b) Reduction of iron oxide with a reducing gas such as hydrogen to obtain Fe or Fe—Co particles.

(c) Thermal decomposition of a metal carbonyl compound.

(d) Reduction by addition of a reducing agent such as sodium boron hydride, hypophosphite, or hydrazine to the aqueous solution of a ferromagnetic metal.

(e) The use of a mercury cathode to precipitate by electrolysis a ferromagnetic metal powder, followed by separation from the mercury.

(f) The vaporization of a metal in an inert gas and under low pressure to obtain micropowder.

Plate-shaped hexagonal barium ferrite may also be employed as ferromagnetic powder in the present invention. The barium ferrite has a particle size with a diameter ranging from about 0.001 to 1 $\mu$m and a thickness ranging from about ½ to ½₀ of the diameter. The specific gravity of barium ferrite ranges from about 4 to 6 m/mL and its specific surface area ranges from 1 to 70 $m^2/g$.

As necessary, $FeOx(X=1.33$ to $1.50)$, Co-containing FeOx, and the like may also be employed.

The nonmagnetic powder disclosed in Japanese Unexamined Patent Publication (KOKAI) Showa No. 59-110038, for example, may be employed in the backcoat layer of the present invention. Examples of various powders suitable for use are: carbon black, graphite, tungsten disulfide, boron nitride, silicon dioxide, calcium carbonate, aluminum oxide, iron oxide, titanium dioxide, magnesium oxide, zinc oxide, calcium oxide, lithopone, talc, stannic oxide, and the like.

The average particle size of these nonmagnetic powders normally ranges from 0.005 to 5.0 $\mu$m, with the use of such a powder falling within the range of 0.010 to 2.0 $\mu$m being preferred.

Examples of resin components of binders suitable for use in the present invention are conventionally known thermoplastic resins, thermosetting resins, reactive resins, electron-beam curing resins, ultraviolet curing resins, visible light curing resins, and mixtures thereof.

The thermosetting resins employed desirably have softening points equal to or less than 150° C., number average molecular weights of 10,000 to 300,000, and degrees of polymerization of about 50 to 2,000, more preferably about 200 to 600. Examples suitable for use are: vinyl chloride vinyl acetate copolymers, vinyl chloride polymers, vinyl chloride vinyl acetate vinyl alcohol copolymers, vinyl chloride vinylidene chloride copolymers, vinyl chloride acrylonitrile copolymers, acrylic ester acrylonitrile copolymers, acrylic ester vinylidene chloride copolymers, acrylic ester styrene copolymers, methacrylic ester acrylonitrile copolymers, methacrylic ester vinylidene chloride copolymers, methacrylic ester styrene copolymers, urethane elastomers, nylon-silicon resins, nitrocellulose-polyamide resins, polyvinyl fluoride, vinylidene chloride acrylonitrile copolymers, butadiene acrylonitrile copolymers, polyamide resins, polyvinylbutyral, cellulose derivatives (cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, acetyl cellulose, and the like), styrene butadiene copolymer, polyester resin, polycarbonate resin, chlorovinylether acrylic ester copolymers, amino resins, various component rubber thermosetting resins, and mixtures thereof.

Thermosetting resins and reactive resins that are suitable for use have a molecular weight of 200,000 or less in the coating material and can be heated and wetted following coating and drying to subject them to reactions such as condensation and addition to obtain compounds of extremely high molecular weight. Of these, the use of compounds that do not soften or melt prior to the thermal decomposition of the resin is preferred. Specific examples of compounds suitable for use are: phenol resins, phenoxy resins, epoxy resins, polyurethane resins, polyester resins, polyurethane polycarbonate resins, urea resins, melamine resins, alkyd resins, silicon resins, acrylic reactive resins (electron beam cured resins), epoxy-polyamide resins, nitrocellulose melamine resins, mixtures of high molecular weight polyester resins and isocyanate prepolymers, mixtures of methacrylate copolymers and diisocyanate prepolymers, mixtures of polyester polyols and polyisocyanates, urea formaldehyde resins, mixtures of low molecular weight glycol/high molecular weight diol/triphenylmethane triisocyanates, polyamine resins, polyimine resins, and mixtures thereof.

Usually, one to six members from among the group consisting of carboxylic acid (COOM), sulfinic acid, sulfenic acid, sulfonic acid ($SO_3M$), phosphoric acid (PO(OM)(OM)), phosphonic acid, sulfuric acid ($OSO_3M$), acid groups thereof such as ester groups (M denoting H, an alkali metal, an alkaline earth metal, or a hydrocarbon group), amino acids, aminosulfonic acids, sulfuric acid and phosphoric acid esters of amino alcohols, amphoteric groups such as alkyl betaines, amino groups, imino groups, imido groups, amide groups, hydroxyl groups, alkoxyl groups, thiol groups, alkylthio groups, halogen groups (F, Cl, Br, I), silyl groups, siloxane groups, epoxy groups, isocyanate groups, cyano groups, nitryl groups, oxo groups, acryl groups, and phosphine groups are incorporated as functional groups into the thermoplastic resin, thermosetting resin, or reactive resin, with from $1 \times 10^{-6}$ to $1 \times 10^{-2}$ equivalent of functional groups desirably being present per gram of resin.

The curing agent of the binder is not specifically limited. However, a polyisocyanate compound is usually employed.

Examples of polyisocyanate compounds suitable for use are: isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate and isophorone diisocyanate, products of these isocyanates and polyalcohols, dimmer to decamer of polyisocyanates produced by condensation of isocyanates, and products of triisocyanates and polyurethane having an isocyanate as terminal functional group. The average molecular weight of these polyisocyanates desirably ranges from 100 to 20,000. These isocyanates are commercially available under the following trade names, for example: Coronate L, Coronate HL, Coronate 2030, Coronate 2031, Millionate MR and Millionate MTL (manufactured by Nippon Polyurethane Industry Co. Ltd.); Takenate D-102, Takenate D-110N, Takenate D-200, Takenate D-202, Takenate 300S, and Takenate 500 manufactured by (Takeda Chemical Industries Co. Ltd.); Sumidule T-80, Sumidule 44S, Sumidule PF, Sumidule L, Sumidule N, Desmodule L, Desmodule IL, Desmodule N, Desmodule HL, Desmodule T65, Desmodule 15, Desmodule R, Desmodule RF, Desmodule SL, and Desmodule Z4273 (manufactured by Sumitomo Bayer Co. Ltd.). They can be used singly or in combinations of two or more by exploiting differences in curing reactivity.

To promote the curing reaction, compounds having hydroxyl groups (butanediol, hexanediol, polyurethane having a molecular weight of 1,000 to 10,000, water, and the like) and amino groups (monomethylamine, dimethylamine, trimethylamine, and the like) as well as catalysts in the form of metal oxides may also be employed together in the binder employed in the present invention. These compounds having hydroxyl groups or amino groups are desirably polyfunctional.

The polyisocyanates are desirably employed in a proportion of 2 to 70 weight parts per 100 weight parts of the total quantity of binder resin and polyisocyanates combined in the magnetic layer and the backcoat layer, with the use of 5 to 50 weight parts being preferred. Specific examples are described in Japanese Unexamined Patent Publication (KOKAI) Showa Nos. 60-131622 and 61-74138.

The mixing ratio of the binder in the backcoat layer usually ranges from 8 to 400 weight parts, preferably from 10 to 80 weight parts, per 100 weight parts of nonmagnetic powder. In the magnetic layer, 5 to 300 weight parts is the usual ratio.

Examples of types of carbon black employed in the present invention are: furnace black for rubber, thermal for rubber, black for coloring, and acetylene black. These carbon blacks are employed in the tape with the objectives of preventing static electricity, blocking light, controlling the coefficient of friction, and increasing durability.

Abbreviations of carbon black employed in the United States include SAF, ISAF, IISAF, T, HAF, SPF, FF, FEF, HMF, GPF, APF, SRF, MPF, ECF, SCF, CF, FT, MT, HCC, KCF, MCF, LFF, and RCF; those classified under U.S. ASTM standard D-1765-82a may be employed. The average particle size of these carbon blacks that can be employed in the present invention ranges from 5 to 1,000 nm (electron microscope), the specific surface area thereof as measured by nitrogen adsorption ranges from 1 to 800 m²/g, the pH ranges from 4 to 11 (JIS Standard K-6221-1982), and the dibutyl phthalate (DBP) oil absorption capacity ranges from 10 to 800 mL/100 g (JIS Standard K-6221-1982). When lowering the surface electrical resistivity of the magnetic layer and/or backcoat layer, carbon black with a particle diameter of 5 to 100 nm can be employed, and when controlling the strength of the magnetic layer and/or backcoat layer, carbon black with a particle diameter of 50 to 1,000 nm can be employed. To control the surface roughness of the magnetic layer, smaller microgranular carbon black (smaller than 100 nm) can be employed than when smoothing to reduce spacing loss. When reducing the coefficient of friction by roughening the surface of the magnetic layer and/or backcoat layer, coarse granular carbon black (100 nm or larger) can be employed. The type and quantity of carbon black that is added can thus be different depending on the objectives being sought in the magnetic recording medium.

The carbon black can further be surface treated with a dispersing agent, described further below, or grafted with resin for use. Carbon black a portion of which has been converted to graphite by setting the temperature of the furnace employed when manufacturing carbon black to 2,000° C. or above may also be employed. Further, as a form of special carbon black, hollow carbon black may also be employed.

These types of carbon black are usually employed in the backcoat layer in a proportion of 20 to 400 weight parts, preferably 50 to 150 weight parts, per 100 weight parts of binder. In the magnetic layer, 0.1 to 30 weight parts are desirably employed per 100 weight parts of ferromagnetic powder. *The Carbon Black Handbook* compiled by the Carbon Black Association (published in 1971) may be consulted for types of carbon black suitable for use in the present invention. Examples of these carbon blacks are given in U.S. Pat. Nos. 4,539,257 and 4,614,685 as well as Japanese Unexamined Patent Publication (KOKAI) Showa Nos. 61-92424 and 61-99927.

In the present invention, abrasives may be employed to improve the durability of the magnetic recording medium and improve the head cleaning effect in VTRs. Abrasives suitable for use are materials generally having a polishing or burnishing effect. Examples are materials chiefly having a Mohs' hardness equal to or higher than 6, preferably equal to or higher than 8, such as α-alumina, γ-alumina, α, γ-alumina, fused alumina, silicon carbide, chromium oxide, cerium oxide, corundum, artificial diamond, α-iron oxide, garnet, emery (chiefly comprised of corundum and magnetite), garnet, silica rock, silicon nitride, boron nitride, molybdenum carbide, boron carbide, tungsten carbide, titanium carbide, quartz, tripoli, diatomaceous earth and dolomite in combinations of about 1 to 4. The average particle diameter of these abrasives preferably ranges from 0.005 to 5 μm, more preferably from 0.01 to 2 μm. These abrasives are employed in a proportion of 0.01 to 5 weight parts, more preferably, 0.1 to 3.0 weight parts, per 100 weight parts of binder in the backcoat layer. They are desirably added to the magnetic layer in a range of 0.01 to 20 weight parts per 100 weight parts of the ferromagnetic powder. Specific examples of abrasives are AKP1, AKP15, AKP20, AKP30, AKP50, AKP80, Hit50, and Hit100 manufactured by Sumitomo Chemical Co., Ltd.). These are described with specificity in Japanese Examined Patent Publication (KOKOKU) Showa No. 52-28642.

Examples of powdered lubricants suitable for use in the present invention are inorganic powders such as graphite, molybdenum disulfide, boron nitride, graphite fluoride, calcium carbonate, barium sulfate, silicon oxide, titanium oxide, zinc oxide, tin oxide, and tungsten disulfide; and resin powders such as acryl styrene resin powder, benzoguanamine resin powder, melamine resin powder, polyolefin resin powder, polyester resin powder, polyamide resin powder, polyimide resin powder, and polyethylene fluoride resin powder.

Examples of organic compound lubricants are: compounds incorporating fluorine or silicon such as silicone oils (dialkyl polysiloxane, dialkoxy polysiloxane, phenyl polysiloxane, fluoroalkyl polysiloxane (KF96 and KF 69 manufactured by Shin-Etsu Chemical Co., Ltd. and the like)), fatty acid-modified silicone oils, fluoroalcohols, polyolefins (polyethylene waxes, polypropylene, and the like), polyglycols (ethylene glycol, polyethylene oxide wax, and the like), tetrafluoroethyleneoxide wax, polytetrafluoroglycol, perfluoroalkylether, perfluorofatty acids, perfluorofatty acid esters, perfluoroalkyl sulfuric acid esters, perfluoroalkyl sulfonic acid esters, perfluoroalkylbenzene sulfonic acid esters and perfluoroalkyl phosphoric acid esters, organic acid and organic acid ester compounds such as alkyl sulfuric acid esters, alkyl sulfonic acid esters, alkyl phosphonic acid triesters, alkyl phosphonic acid monoesters, alkyl phosphonic acid diesters, alkyl phosphoric acid esters and succinic acid esters, nitrogen and sulfur-comprising heterocyclic compounds such as triazaindolizine, tetraazaindene, benztriazole, benzdiazole and EDTA, fatty acid esters comprising a monobasic fatty acid having 10 to 40 carbon atoms and one or more monohydric alcohols, dihydric alcohols, trihydric alcohols, tetrahydric alcohols, or hexahydric alcohols having 2 to 40 carbon atoms, fatty acid esters comprising a monobasic fatty acid having ten or more carbon atoms and a monohydric to hexahydric alcohol having a total number of carbon atoms including those of the monobasic fatty acid of 11 to 70, a fatty acid amide or fatty acid having 8 to 40 carbon atoms, a fatty acid alkylamide, or an aliphatic alcohol.

Specific examples of these compounds are: butyl caprylate, octyl caprylate, ethyl laurate, butyl laurate, octyl laurate, ethyl myristate, butyl myristate, octyl myristate, 2-ethylhexyl myristate, ethyl palmitate, butyl palmitate, octyl palmitate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2-hexyldexyl stearate, isotridecyl stearate, amide stearate, alkylamide stearate, butoxyethyl stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, and carnauba wax. They may be employed singly or in combination.

In the present invention, lubricating oil additives may also be employed singly or in combination as lubricants. Examples are antioxidants known as rust preventing agents (other metal chelating agents such as alkyl phenol, benzotriazine, tetraazaindene, sulfamide, guanidine, nucleic acids, pyridine, amines, hydroquinone and EDTA), rust stopping agents (naphthenic acid, alkenyl succinate, phosphoric acid, dilauryl phosphate and the like), oily agents (rapeseed oil, lauryl alcohol, and the like), extreme pressure agents (dibenzylsulfide, tricresyl phosphate, tributyl phosphite, and the like), detergent dispersants, viscosity index increasing agents, fluidity point decreasing agents, and antifoaming agents. These lubricants can be employed in the backcoat and magnetic layer in a proportion of a total of 0.01 to 30 weight parts per 100 weight parts of binder. In particular, they are added with preference to the backcoat layer in a proportion of 0.05 to 5 weight parts.

Examples of dispersants and dispersion adjuvants suitable for use in the present invention are: fatty acids having 2 to 40 carbon atoms such as caprylic acid, capric acid, lauric acid, myristic acid, palmitic acid, stearic acid, oleic acid, elaidic acid, linolic acid, linolenic acid, stearolic acid, behenic acid, maleic acid, and phthalic acid (R1COOH, where R1 denotes an alkyl group, phenyl groups, or aralkyl group having 1 to 39 carbon atoms); metallic soaps comprising alkali metal (Li, Na, K, or the like) salts or alkaline earth metal (Mg, Ca, Ba, or the like) salts of the above-listed fatty acids, $NH^{4+}$, Cu, Pb, or the like (copper oleate); fatty acid amides; and lecithin (soybean oil lecithin). Further compounds suitable for use are higher alcohols (butanol, octyl alcohol, myristyl alcohol, stearyl alcohol) having 4 to 40 carbon atoms; sulfuric acid esters of the same; sulfonic acid; phenyl sulfonate; alkyl sulfonate; sulfonic acid ester; phosphoric acid monoester; phosphoric acid diester; phosphoric acid triester; alkyl phosphonate; phenyl phosphonate; and amine products. Further, polyethylene glycol, polyethylene oxide, sulfosuccinic acid, sulfosuccinic acid metal salts, sulfosuccinic acid esters, and the like may also be employed. These dispersants are usually employed singly or in combination. A single dispersant can be added to the backcoat or magnetic layer in a proportion of 0.005 to 20 weight parts per 100 weight parts of binder. The addition of a proportion of 0.01 to 2 weight parts to the backcoat layer is particularly desirable. These dispersants may be precoated on the surface of the ferromagnetic powder or nonmagnetic powder or added during dispersion. The specific details are described, for example, in Japanese Examined Patent Publication (KOKOKU) Showa Nos. 39-28369, 44-17945, and 48-15001, as well as U.S. Pat. Nos. 3,387,993 and 3,470,021.

In the present invention, an antimildew agent may be employed in the form of 2-(4-thiazolyl)benzimidazole, N-(fluorodichloromethylthio)phthalimide, 10,10'-oxybisphenoxarsine, 2,4,5,6-tetrachloroisophthalonitrile, P-tolyldiiodomethylsulfone, triiodoallylalcohol, dihydroacetoacetic acid, mercury phenyloleate, bis(tributyltin) oxide, salicylanilide, and the like. Antimildew agents are described, for example, in "Microorganism Harm and Prevention Techniques," 1972, Kogaku Tosho, and "Chemistry and Industry", 32, 904 (1979).

In the present invention, antistatic agents other than carbon black are sometimes employed in the form of electrically conductive powders such as graphite, denatured graphite, carbon black graphite polymer, tin oxide-antimony oxide, tin oxide and titanium oxide-tin oxide-antimony oxide; natural surfactants such as saponin; nonionic surfactants such as alkylene oxides, glycerin, glycidol, polyhydric alcohols, polyhydric alcohol esters and alkyl phenol EO adducts; cationic surfactants such as higher alkylamines, cyclic amines, hydantoin derivatives, amidoamines, esteramides, quaternary ammonium salts, pyridine and other heterocycles, phosphoniums and sulfoniums; anionic surfactants comprising acid group such as carboxylic acid, sulfonic acid, phosphonic acid, phosphoric acid, sulfuric acid ester groups, phosphonic acid esters and phosphoric acid ester groups; amino acids; aminosulfonic acids, sulfuric acid and phosphoric acid esters of amino alcohols, amphoteric surfactants such as alkyl betaine. These surfactants may be added singly or in combination. These antistatic agents are preferably added to the backcoat layer in a proportion falling within a range of 0.01 to 30 weight parts, preferably 0.1 to 5 weight parts, per 100 weight parts of binder, and to the magnetic layer in a proportion of 0.01 to 10 weight parts per 100 weight parts of ferromagnetic powder. Although these are employed as antistatic agents, they may in some cases also be employed to improve magnetic characteristics, improve lubrication, as coating adjuvants, moistening agents, curing promoters, and to promote dispersion.

The backcoat layer may be formed by the usual methods. For example, the above-described nonmagnetic powder, resin components, and, as needed, backcoat forming components such as abrasives and curing agents may be kneaded and dispersed along with a solvent to prepare a backcoat layer coating liquid and it is then applied by a coating method to a flexible support.

The magnetic layer coating material can be essentially prepared by the same method as the backcoat layer coating material by replacing the nonmagnetic powder with ferromagnetic powder.

Examples of organic solvents suitable for use during the dispersion, kneading, and coating of the backcoat layer coating material and the magnetic layer coating material are: ketones such as acetone, methyl ethyl ketone, methyl isobutyl ketone, cyclohexanone, isophorone and tetrahydrofuran; alcohols such as methanol, ethanol, propanol, butanol, isobutyl alcohol, isopropyl alcohol and methyl cyclohexanol; esters such as methyl acetate, ethyl acetate, butyl acetate, isobutyl acetate, isopropyl acetate, ethyl lactate and glycol acetate monoethylether; ethers such as diethylether, tetrahydrofuran, glycol dimethylether, glycol monoethylether and dioxane; tars (aromatic hydrocarbons) such as benzene, toluene, xylene, cresol, chlorobenzene and styrene; chlorinated hydrocarbons such as methylene chloride, ethylene chloride, carbon tetrachloride, chloroform, ethylene chlorohydrin and dichlorobenzene; N,N-dimethylformaldehyde; and hexane. Two or more of these solvents are usually employed in some ratio. Further, these organic solvents may comprises a small quantity—one weight percent or less—of impurities (polymers of the solvent itself, moisture, starting material components, and the like). These solvents are employed in a proportion of 100 to 20,000 weight parts per 100 weight parts of the total solid component of the magnetic layer coating material, backcoat layer coating material, or undercoating liquid. The solid component ratio of the magnetic layer coating material desirably ranges from 10 to 40 weight percent. Further, the solid component ratio of the backcoat layer coating material desirably ranges from 5 to 20 weight percent. An aqueous solution (water, alcohol, acetone, or the like) may be employed instead of an organic solvent.

The dispersion and kneading methods are not specifically limited. Further, the order in which individual components (resin, powder, lubricants, solvent, and the like) are added, the spot in which they are added during dispersion and kneading, the dispersion temperature (0 to 80° C.), and the like may be suitably determined. In the preparation of the magnetic layer coating material and the backcoat layer coating material, the usual kneaders may be employed. Examples are: a double roll mill, triple roll mill, ball mill, pebble mill, sand grinder, Szegvari, Atliter, high-speed impellor, disperser, high-speed stone mill, high-speed impact mill, disper, kneader, high-speed mixer, ribbon blender, co-kneader, intensive mixer, tumbler, blender, disperser, homogenizer, single-screw extruder, twin-screw extruder, and ultrasound disperser. In usual dispersion and kneading, multiple dispersers and kneaders are employed and processing is conducted continuously. Specifics of techniques relating to kneading and dispersion are described in T. C. Patton, "Paint Flow and Pigment Dispersion," John Wiley & Sons (1964); Shinichi Tanaka, "Kogyo Zairyo", Vol. 25, p. 37 (1977); and the references cited by these publications. To conduct efficient dispersion and kneading, auxiliary materials in the form of organic polymer beads, glass beads, ceramic beads, steel beads, or steel balls with a corresponding spherical diameter of 0.05 mm to 10 cm may be employed. The materials are not limited to being spherical. The items described in U.S. Pat. Nos. 2,581,414 and 2,855,156 may also be employed. In the present invention, kneading and dispersion may be conducted in accordance with methods described in the above-cited publications and in references cited by these publications to prepare the magnetic layer coating material and the backcoat layer coating material.

Examples of methods suitable for use in applying the magnetic layer coating material and the backcoat layer coating material on the support are: adjusting the viscosity of the coating material to 1 to 20,000 centistokes (25° C.) followed by the use of air doctor coating, blade coating, air knife coating, squeeze coating, immersion coating, reverse roll coating, transfer roll coating, gravure coating, kiss coating, cast coating, spray coating, rod coating, positive rotation roll coating, curtain coating, bar coating, extrusion coating, and spin coating. Other methods may also be employed. These methods are described in detail in "The Coating Industry", pp. 253–277 (Asakusa Shoten, published Mar. 20, 1971).

The order in which these coating materials are applied may be selected as desired. Further, an undercoating layer may be formed prior to applying the layer coating material, and corona discharge treatment may be applied to enhance adhesion to the support. Further, when the magnetic layer or the backcoat layer is of a multilayer configuration, the multiple layers may be applied simultaneously or sequentially. The specifics thereof are described in Japanese Unexamined Patent Publication (KOKAI) Showa No. 57-123532 and Japanese Examined Patent Publication (KOKOKU) Showa No. 62-37451.

The magnetic layer coating material that has been applied by these methods to a thickness of about 1 to 200 $\mu$m on the support may be further subjected as needed to magnetic orientation in a desired direction (vertical, longitudinal, width, random, slanting, or the like) at about 0.05 to 0.5 T in which the ferromagnetic powder in the layer is oriented while, as needed, the ferromagnetic powder is immediately subjected to multistages of drying at 20 to 130° C., and dried to obtain a magnetic layer 0.1 to 30 $\mu$m in thickness. The conveyance rate of the support during this process usually ranges from 10 to 900 m/min, the drying temperature is controlled to 20 to 130° C. in multiple drying zones, and the quantity of residual solvent in the coating film is set to 0.1 to 40 mg/(½ inch)/m².

Following drying, calendering of the coated layers (including the backcoat layer and magnetic layer) is conducted as needed. For example, super calender rolls or the like may be employed in calendering. Calendering reduces voids created by the removal of solvent during drying and increases the fill rate of ferromagnetic powder in the magnetic layer, thereby yielding a magnetic recording medium with good electromagnetic characteristics.

When a curing agent is employed as part of the binder, once calendering has been completed, 90 weight percent or more of the curing agent contained in the coating layer is usually present in unreacted form. Thus, it is desirable that a curing treatment is conducted to cause at least 50 weight percent (in-particular, preferably 80 weight percent or more) of the curing agent to react, after which the next process is desirably performed. There are two types of curing treatments: heat curing treatments and electron beam curing treatments. In the present invention, either of these methods may be employed. The curing treatment causes the unreacted curing agent contained in the calendered coating layer to react, whereby, for example, resin components such as vinyl chloride copolymer and polyurethane resin form a three-dimensional meshlike crosslinked structure. The processes employed in heat treatment are known; heat treatment based on such methods may be employed in the present invention. For example, the heating temperature is usually equal to or higher than 40° C. (preferably within the range of 50 to 80° C.) and the heating time is usually equal to or higher than 20 hr (preferably 24 hr to 7 days). Curing treatment based on electron-beam irradiation is also known; curing treatments based on such methods may be employed in the present invention.

The linear pressure during calendering usually ranges from 50 to 800 kg/cm, preferably from 100 to 600 kg/cm, and still more preferably from 200 to 500 kg/cm.

In the present invention, the magnetic tape thus manufactured is slitted by the above described new slitting system using a slitter under conditions satisfying the meandering requirements of the present invention, and wound on plastic or metal reels. At that time, slitting is desirably conducted so that the backcoat layer end surface does not extend beyond a line drawn from the tip of the maximum convex of the flexible support in the slit sectional surface in a vertical direction. Such a sectional surface structure prevents scraping of and powder dropout from the backcoat layer during contact between the magnetic tape and the guide rollers of the VTR.

In the present invention, the surface of the magnetic layer and the backcoat layer thus produced may be burnished with a polishing tape in a step immediately preceding winding or in an earlier step. The specifics of burnishing are described in Japanese Unexamined Patent Publication (KOKAI) Showa No. 63-259830, for example.

Further, the magnetic recording medium is subjected to a wiping process to remove grime and excess lubricant from the magnetic tape surface. Usually, a nonwoven cloth is employed to wipe the magnetic layer surface, backcoat layer surface and the like. The wiping material employed may be in the form of various Vilenes manufactured by Japan Vilene Company, Ltd., Toraysee and Exene manufactured by Toray Industries, Inc., Kuraray WRP series from Kuraray Co., Ltd., nonwoven cloth made of nylon, nonwoven cloth made of polyester, nonwoven cloth made of rayon, nonwoven cloth made of acrylonitrile, and mixed fiber nonwoven cloth. Tissue paper and Kim Wipes may also be employed. The specifics are described in Japanese Unexamined Patent Publication (KOKAI) Heisei No. 1-201824. The wiping treatment completely removes organic substances and substances adhering to the magnetic layer and/or backcoat layer, thus permitting a reduction in dropout and in the frequency of clogging.

The magnetic tape of the present invention is desirably manufactured by consecutively conducting the steps of preliminary processing and surface processing of powders such as the ferromagnetic powder and nonmagnetic powder; kneading and dispersion; coating, orientation, and drying; calendering; curing (thermosetting, radiation treatment (EB)); cutting; burnishing; wiping; and winding. In this area, the methods described in Japanese Examined Patent Publication (KOKOKU) Showa No. 41-13181 are considered basic and important techniques. However, the processing sequence is not limited to that stated above.

The ferromagnetic powders, nonmagnetic powders, binders, additives (lubricants, dispersants, antistatic agents, surface treatment agents, carbon black, abrasives, light-blocking agents, antioxidants, antimildew agents, and the like), solvents, and supports suitable for use in the present invention as well as methods of manufacturing magnetic recording media that are described in Japanese Examined Patent Publication (KOKOKU) Showa No. 56-26890 may be referred to.

EMBODIMENTS

Embodiments are given below to more specifically describe the present invention. The components, ratios, operation sequences, operation conditions, and the like given in the embodiments below may be suitably modified while remaining within the spirit of the present invention. Accordingly, the scope of the present invention is not limited to the embodiments set forth below.

The Manufacturing of Magnetic Tape

Methods of manufacturing the magnetic tape of the present invention (Embodiments 1 and 2) and magnetic tapes for comparison (Comparative Examples 1 to 3) are described below.

Each of the components of Composition 1 described below was charged to a kneader and thoroughly kneaded. Subsequently, Composition 2 described below was added to the mixture and thoroughly kneaded. Prior to coating, Composition 3 was added, kneaded, and dispersed to prepare a magnetic layer coating liquid. After adjusting the viscosity of the magnetic layer coating material, it was coated onto a flexible support in the form of polyethylene naphthalate (7 $\mu$m in thickness, Young's modulus in longitudinal direction of 6.37 GPa (650 kg/mm$^2$), Young's modulus in width direction of 8.33 GPa (850 kg/mm$^2$)) to a dry thickness of 3 $\mu$m. The coated magnetic layer was magnetically oriented using a 0.3 T cobalt magnet and a solenoid and then dried.

Compositions 1 to 3 for Preparing Magnetic Layer Coating material

| Component | Weight parts |
|---|---|
| (Composition 1) | |
| Ferromagnetic metal powder[1] | 100 |
| Phosphoric acid ester (phenylphosphonic acid) | 2 |
| Vinyl chloride copolymer resin | 9.5 |
| (manufactured by Nippon Zeon Co., Ltd.: MR110) | |
| Polyurethane resin (manufactured by Toyobo Co., Ltd.: UR8300) | 5 |
| 2-ethylhexyl palmitate | 0.6 |
| Cyclohexanone | 60 |
| Methyl ethyl ketone | 80 |

Note
[1]Chief component Fe, contained 22 atomic percent of Co and 10 atomic percent of Al relative to Fe, major axis length 0.08 $\mu$m, specific surface area ($S_{BET}$) 57 m$^2$g.

| | |
|---|---|
| (Composition 2) | |
| Carbon black | 1 |
| (manufactured by Mitsubishi Chemical Corporation: #3250B) | |
| Polyurethane resin (manufactured by Toyobo Co., Ltd.: UR8300) | 1 |
| Methyl ethyl ketone | 10 |
| Dispersion 2 | |
| Abrasive | 13 |
| (Manufactured by Sumitomo Chemical Co., Ltd.: HIT55 [$\alpha$-Al$_2$O$_3$]) | |
| Vinyl chloride copolymer resin | 1 |
| (manufactured by Nippon Zeon Co., Ltd.: MR110) | |
| Cyclohexanone | 60 |
| Methyl ethyl ketone | 40 |
| (Composition 3) | |
| Polyisocyanate | 4 |
| (manufactured by Nippon Polyurethane Industry Co., Ltd.: Coronate 3040) | |
| Amide stearate | 0.5 |
| Palmitic acid | 0.5 |
| Butoxyethyl stearate | 0.5 |
| Methyl ethyl ketone | 50 |
| Toluene | 30 |

Composition 5 below was admixed to Composition 4 below immediately prior to coating to prepare a backcoat layer coating material. The backcoat layer coating material was coated so as to yield a dry thickness of 0.6 $\mu$m on the reverse surface of the support from where the magnetic layer had been coated and then dried.

| Compositions 4 and 5 for Preparation of Backcoat Layer Coating material | |
|---|---|
| Component | Weight parts |
| (Composition 4) | |
| Carbon black (manufactured by Cabot Corporation: BP800) | 97 |
| Carbon black (manufactured by Cancarb Limited: MTCI) | 3 |
| α-$Al_2O_3$ (manufactured by Sumitomo Chemical Co., Ltd.: HIT55) | 0.1 |
| 2-Ethylhexyl stearate | 0.5 |
| Copper oleate | 0.1 |
| Vinyl chloride copolymer resin (manufactured by Nippon Zeon Co., Ltd.: MR110) | 50 |
| Polyurethane resin (manufactured by Toyobo Co., Ltd.: UR8300) | 40 |
| Cyclohexanone | 200 |
| Methyl ethyl ketone | 300 |
| (Composition 5) | |
| Polyisocyanate (manufactured by Nippon Polyurethane Industry Co., Ltd.: Coronate 3040) | 20 |
| Methyl ethyl ketone | 3,500 |
| Toluene | 200 |
| Silicone compound (manufactured by Shin-Etsu Chemical Co., Ltd.: KF69) | 0.1 |

The product was calendered five times with metal rolls at a temperature of 90° C., linear pressure of 350 kg/cm, and rate of 200 m/min to manufacture a layered product having a magnetic layer on one surface of a flexible support and a backcoat layer on the reverse surface thereof. The layered product was maintained at 60° C. for 24 hr to cure the polyisocyanate compounds contained within it.

Subsequently, either the conventional slitting system or the new slitting system was used to slit to ½ inch in width. The slitter and slitting rate employed were varied as indicated in Table 1 for the embodiments and comparative examples. However, the interlocking depth was a uniform 0.5 mm and the peripheral velocity ratio was a uniform 1.05 during slitting. After slitting, polishing tape (manufactured by Fuji Photo Film Co., Ltd.: K10000) was employed to burnish the magnetic layer surface and a wiping material (manufactured by Kuraray Co., Ltd.: WRP736) was employed for wiping, yielding a ½ inch video tape.

Evaluation Methods

1. Stiffness Measurement

Figure 3:
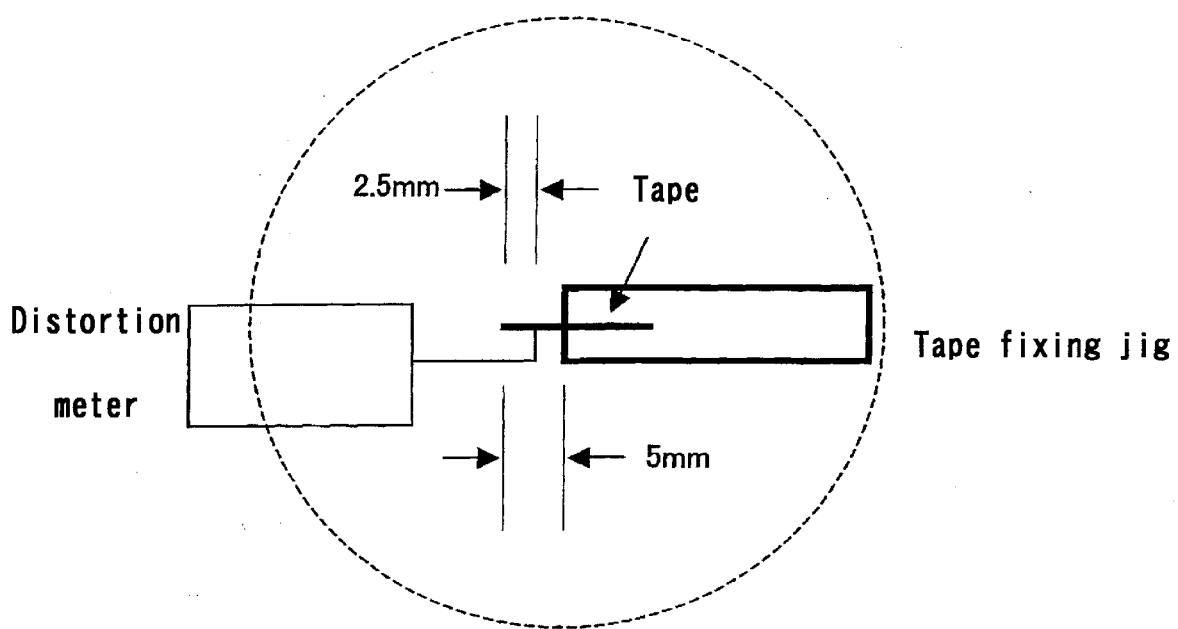
FIG. 3 is a schematic view of a method of measuring stiffness.

As shown in FIG. 3, a specialized jig was clamped on so as to permit unencumbered bending to just 5 mm from one edge of the tape being measured in the width direction, and in the center of the unencumbered portion in the width direction (that is, at a position 2.5 mm from the edge), a distortion gauge mounted on a base permitting rotation around the edge portion clamped by the jig as a rotation center was contacted in a direction vertical to the magnetic layer surface, the rotating base was rotated 20° by applying a load, and the value thus obtained by the load was adopted as the stiffness value.

2. Measurement of the Intensity Ratio of Meandering Components

The intensity ratio of meandering components with a cycle of 20 to 200 mm (short cycle meandering components) was measured by running 10 m of the magnetic tape at a tension of $1.5 \times 10^{-3}$ N and a speed of 20 mm/s, enlarging the optical image of the tape edge trajectory, picking up the image with a CCD line camera, inputting the motion trajectory of the enlarged optical image to an arithmetic unit as the time deviation signal of the tape edge, conducting a FFT operation of the voltage inputted by a spectral analyzer R9211 made by Advantest, and converting it to a power spectrum (dB). The intensity ratio was the integral of the area of cycle 20 to 200 mm when the integral of the area of cycle 20 to 10,000 of the power spectrum was made 100.

3. Measurement of Amount of Meandering

The tape being measured was run at a rate of 20 mm/s and a tension of 0.147 N and measured with a ZDR manufactured by Kosaka Research Laboratory (Ltd.).

4. Measurement of Output Variation

Two D3VTR units manufactured by Matsushita were employed. An RF signal was recorded with one of the VTRs on the tape being tested and the RF waveform reproduced by the other VTR was observed by oscilloscope. An output level with no variation was denoted as an output variation of 0 percent, a decrease in output level of 6 dB was denoted as an output variation of 100 percent. The maximum value of output variation for a 10 m length of tape was adopted as the output variation of the tape.

The results are given in Table 1 below.

| | Manufacture method | Slit speed (m/min) | Stiffness mg · $mm^2$ | Intensity ratio of meandering components of 20 to 200 mm (%) | Amount of meander- ing(μm) | Output variation (%) |
|---|---|---|---|---|---|---|
| Embodiment 1 | New slitting system | 400 | 65 | 10 | 15 | 10 |
| Embodiment 2 | New slitting system | 500 | 62 | 20 | 10 | 15 |
| Comp.Ex.1 | Conventional slitting system | 400 | 64 | 40 | 18 | 45 |

-continued

The results are given in Table 1 below.

| | Manufacture method | Slit speed (m/min) | Stiffness mg · mm² | Intensity ratio of meandering components of 20 to 200 mm (%) | Amount of meander- ing(μm) | Output variation (%) |
|---|---|---|---|---|---|---|
| Comp.Ex.2 | Conventional slitting system | 600 | 63 | 55 | 8 | 50 |
| Comp.Ex.3 | Conventional slitting system | 200 | 65 | 5 | 25 | 35 |

The magnetic tape of the present invention, in which the average amount of meandering of the tape edge trajectory is equal to or less than 15 μm and the intensity of meandering components with cycles of 20 to 200 mm is equal to or less than 30 percent of the intensity of meandering components with cycles of 20 to 10,000 mm, is characterized by good tracking in VTRs and extremely low output variation. Accordingly, even in thin tapes with width direction stiffnesses equal to or less than 70 mg·mm², tracking is possible in commonly used VTRs and good magnetic characteristics can be achieved.

The present disclosure relates to the subject matter contained in Japanese Patent Application No. 2000-326517 filed on Oct. 26, 2000, which is expressly incorporated herein by reference in its entirety.

What is claimed is:

1. A magnetic tape comprising a flexible support, a magnetic layer provided on one side of said flexible support and a backcoat layer provided on the reverse side of said flexible support, wherein said magnetic tape has a stiffness equal to or less than 70 mg·mm² in the width direction, an average meandering amount of a tape edge trajectory traced by each of both end in the width direction of said tape observed from the direction perpendicular to said magnetic layer surface is equal to or less than 15 μm in every end, and an intensity of a meandering component having a cycle of 20 to 200 mm is equal to or less than 30 percent of the intensity of a meandering component having a cycle of 20 to 10,000 mm.

2. The magnetic recording medium according to claim 1, wherein the intensity of meandering components having a cycle of 20 to 200 mm is equal to or less than 20 percent.

3. The magnetic tape according to claim 1, wherein the intensity of meandering components having a cycle of 20 to 200 mm is equal to or less than 10 percent.

4. The magnetic tape according to claim 1, wherein the average meandering amount is equal to or less than 10 μm.

5. The magnetic tape according to claim 1, wherein said magnetic tape has a thickness ranging from 4 to 14 μm.

6. The magnetic tape according to claim 1, wherein said magnetic tape has a thickness ranging from 8 to 11 μm.

7. The magnetic tape according to claim 1, wherein said magnetic layer has a thickness raging from 0.05 to 5.0 μm.

8. The magnetic tape according to claim 1, wherein said magnetic layer has a thickness ranging from 0.1 to 3.5 μm.

9. The magnetic tape according to claim 1, wherein said backcoat layer has a thickness ranging from 0.3 to 1.0 μm.

10. The magnetic tape according to claim 1, wherein said backcoat layer has a thickness ranging from 0.4 to 0.7 μm.

11. The magnetic tape according to claim 1, wherein said flexible support has a thickness ranging from 3 to 10 μm.

12. The magnetic tape according to claim 1, wherein said flexible support has a thickness ranging from 6 to 9 μm.

13. The magnetic tape according to claim 1, wherein said flexible support has a Young's modulus in the longitudinal direction ranging from 3.92 to 11.76 GPa.

14. The magnetic tape according to claim 1, wherein said flexible support has a Young's modulus in the longitudinal direction ranging from 4.41 to 9.80 GPa.

15. The magnetic tape according to claim 1, wherein said magnetic layer comprises a ferromagnetic powder and a binder.

16. The magnetic tape according to claim 15, wherein said ferromagnetic powder is a ferromagnetic metal powder.

17. The magnetic tape according to claim 15, wherein said ferromagnetic powder is a hexagonal barium ferrite.

18. The magnetic tape according to claim 17, wherein said hexagonal barium ferrite is plate-shaped.

* * * * *